United States Patent [19]

Anderson

[11] Patent Number: 5,415,942
[45] Date of Patent: May 16, 1995

[54] GLASS/PLASTIC LAMINATE STRUCTURES FOR GLAZING APPLICATIONS

[75] Inventor: Jerrel C. Anderson, Vienna, W. Va.

[73] Assignee: E. I. Du Pont de Nemours and Company, Wilmington, Del.

[21] Appl. No.: 146,814

[22] Filed: Nov. 4, 1993

[51] Int. Cl.⁶ .............................................. B32B 27/36
[52] U.S. Cl. ..................... 428/447; 428/483; 428/415; 428/437; 428/441; 428/451
[58] Field of Search ............... 428/447, 480, 483, 415, 428/437, 441, 451

[56] References Cited

U.S. PATENT DOCUMENTS

| | | | |
|---|---|---|---|
| 4,197,129 | 4/1980 | Muroi et al. | 430/625 |
| 4,224,270 | 9/1980 | Pears | 264/171 |
| 4,242,381 | 12/1980 | Goossens et al. | 427/412 |
| 4,284,685 | 8/1981 | Olson et al. | 427/387 |
| 4,349,602 | 9/1982 | Ching | 428/451 X |
| 4,382,109 | 5/1983 | Olson et al. | 428/331 |
| 4,404,257 | 9/1983 | Olson | 428/451 X |
| 4,410,594 | 10/1983 | Olson | 428/447 X |
| 4,477,499 | 10/1984 | Doin et al. | 428/447 X |
| 4,486,565 | 12/1984 | Benjamin | 524/506 |
| 4,822,828 | 4/1989 | Swofford | 522/84 |
| 4,871,406 | 10/1989 | Griffith | 156/205 |
| 4,956,227 | 9/1990 | Hirayama et al. | 428/331 |
| 5,041,313 | 8/1991 | Patel | 427/379 |
| 5,069,942 | 12/1991 | Anderson | 427/387 |

FOREIGN PATENT DOCUMENTS

| | | | |
|---|---|---|---|
| 1215627 | 12/1986 | Canada | 27/20 |

*Primary Examiner*—Daniel R. Zirker
*Attorney, Agent, or Firm*—James T. Corle

[57] ABSTRACT

Abrasion resistant polyester film useful in glazing structures having improved adhesion of the abrasion resistant coating to the polyester film are provided by applying an acrylic based primer composition to the polyester film and an overlying coating of a polysiloxane containing less than $23 \times 10^{-6}$ mole per gram of alkali metal cations.

4 Claims, No Drawings

GLASS/PLASTIC LAMINATE STRUCTURES FOR GLAZING APPLICATIONS

FIELD OF THE INVENTION

Glass/plastic laminates suitable for glazing applications are prepared by bonding a tough plastic film which has been coated with a mixed acrylic coating composition on one side and electrostatic discharge, chemical or flame treated on the other side to a sheet of glass using an adhesive film. A special polysiloxane abrasion resistant coating which is applied to the acrylic coating composition exhibits exceptional resistance to blister formation off exposure to high temperature and high humidity conditions.

BACKGROUND OF THE INVENTION

Polysiloxane abrasion resistant coatings are well known for their use with polyester film in glass/plastic laminates. The polyester film is adhered to the glass by an adhesive such as plasticized polyvinylbutyral (PVB). The coatings provide outstanding optical properties, integrity, resistance to crazing at extreme temperatures and abrasion resistance in glazing applications. Generally, the polyester film adheres well to the PVB but adhesion of the abrasion resistant coating to the polyester film is not as satisfactory. Also, there is a tendency for the coating to blister under high temperature and high humidity conditions. Blistering is aggravated by exudation of oligomers from the polyester film. Accordingly, there is a need for better adhesion of the abrasion resistant coating to polyester substrates, a reduction in the tendency of the coating to blister and to seal the surface of the polyester substrate against exudation of oligomers.

SUMMARY OF THE INVENTION

The present invention provides a self-supporting polyester film composite having a continuous primer coating comprised of an acrylic based polymer on one side of the film and a tenaciously adhering abrasion resistant polysiloxane coating overlying the acrylic based polymer coating. The composite is secured to a sheet of glass to provide a glass/polymeric laminate which provides excellent durability to exposure in windshields, sidelites, architectural windows and in other similar uses. The polymeric laminate comprises (a) an adhesive film;

(b) a dimensionally stable polyester film, e.g. polyethylene terephthalate film (PET) bonded to the adhesive film; and (c) overlying coatings on the polyethylene terephthalate film, comprising a primer coating comprising a cross-linkable acrylic polymer and a second coating comprising an abrasion resistant polysiloxane which contains less than $23 \times 10^{-6}$ mole per gram of alkali metal cations.

The primer coating can be applied to a cast polyester film or to the film after machine direction stretching in an on-line process. The primed base film is then stretched biaxially 2 to 5× in both directions, either sequentially or simultaneously, followed by heating at 170° to 240° C. while under restraint to heat set the film and to finalize cross-linking and adhesion of the primer coating to the film. The primer can also be applied to oriented polyester film using a conventional coater. The polyester film can be untreated or flame treated or treated by electrostatic discharge before primer application to enhance wetting and improve adhesion between the polyester substrate and the primer. The unprimed side of the polyester film is treated by flame or electrostatic discharge for enhanced adhesion to an adhesive film, which may be plasticized polyvinyl butyral (PVB), polyurethane or other resins useful for bonding the film to glass.

The polysiloxane abrasion resistant coating is ion-exchanged to remove ions as disclosed in U.S. Pat. No. 5,069,942.

DETAILED DESCRIPTION OF THE INVENTION

In accordance with this invention, an acrylic based primer coating composition is comprised of thermosetting acrylic or methacrylic compositions produced from polymers or copolymers of acrylic acid or methacrylic acid or their esters containing functional groups, such as hydroxy, carboxyl and oxirane groups, and a condensation product of an amine, such as melamine, urea and diazines or their derivatives, with formaldehyde, e.g. a composition based on polyethylacrylate and an amine/formaldehyde condensate; and methyl methacrylate/acrylic acid or methacrylic acid copolymers, e.g. those containing also ethyl acrylate and a uriedo polymer complex. Amide functionality, e.g. acrylamido groups, may be present provided the copolymers also have hydroxy functionality. The polymers can be prepared by direct polymerization using known methods such as emulsion polymerization. The polymers are dispersed in water and applied to a polyester substrate as an aqueous dispersion. Known dispersing agents may be used.

The acrylic based primer is generally applied to provide a coating thickness of from $0.01\mu$ to $10\mu$. However, the thickness is not critical provided the coating is substantially uniform and continuous.

Preferred polyacrylic primer compositions contain functionality which permits cross-linking after application to the substrate. Those containing hydroxy functionality in amounts from as little as 0.01% to as much as 25% by weight are preferred. Particularly preferred compositions contain from 40 to 80% by weight methyl methacrylate, 18 to 60% by weight ethylacrylate, 1 to 15% by weight methacrylic acid and 1 to 15% by weight of a copolymerizable monomer having cross-linkable functional groups such as hydroxy, carboxy and oxirane groups. One specific composition contains 63% by weight methyl methacrylate, 32% by weight ethylacrylate, 3% by weight methacrylic acid and 2% by weight 2-hydroxyethylacrylate. Cross-linking is achieved by including up to 7.5% by weight based on acrylic solids of a cross-linking agent such as melamine formaldehyde.

As the abrasion resistant coating, a polysiloxane abrasion resistant coating (PARC) composition from which alkali metal ions have been removed as disclosed in U.S. Pat. No 5,069,942 is used. The removal of the alkali metal ions can be followed by the addition of quaternary ammonium salts to serve as curing catalysts. A coating having a thickness of about $1-20\mu$ is applied to the primed polyester film. Preferred coating compositions comprise 10 to 70 weight percent silica, up to about 20 weight percent of a polymerized epoxy functional silane, and about 30 to 90 weight percent of a polymerized silanol of the general formula $RSi:(OH)_3$ where R is selected from methyl and up to 40% of a radical selected from the group consisting of vinyl, phenyl, 3-glycidoxypropyl, and 3-methacryloxypropyl with the coating containing less than $23 \times 10^{-6}$ mole per gram of alkali metal cations. More preferred coating compositions contain less than $13 \times 10^{-6}$ mole per gram of alkali metal cations.

Flame treating of the polyester film as well as known electrical discharge treatments can be used to treat the uncoated side of the film. Flame treating techniques include those described in U.S. Pat. No. 2,648,097, U.S. Pat. No. 2,683,984, and U.S. Pat. No. 2,704,382.

Known adhesive materials, including polyurethanes, can be used to bond the polyester film composite of this invention to glass. Preferred material may be selected from plasticized polyvinyl butyral film of the type disclosed in U.S. Pat. No. 4,292,372 which is sold by E. I. du Pont de Nemours & Co. under the trademark Butacite®. The plasticized polyvinyl butyral film should have a thickness from 0.25 to 2.3 mm; however, for some applications greater thicknesses may be used.

Throughout the specification units that were originally recorded in British units have been coverted to SI units.

The invention is further illustrated in the following examples, in which parts and percentages are by weight unless otherwise indicated.

EXAMPLE 1

The following ingredients were used in preparing a PARC solution: LUDOX® LS colloidal silica made by E. I. Du Pont de Nemours & Company, Z-6070 methyltrimethoxysilane made by the Dow Corning Company, A-187 3-glycidoxypropyltrimethoxysilane made by the Union Carbide Company, and SILWET® L-720 wetting agent made also by the Union Carbide Company. LUDOX® LS (600.0 g) was first adjusted to a pH of 4.90 using glacial acetic acid. The Z-6070 silane (442.2 g) and A187 Silane (48.0 g) were mixed together and were then added to the acidified LUDOX® LS, and this mixture was slowly stirred at 25° C. for 5 hours in order to hydrolyze the silanes with the water from the LUDOX. After 5 hours, the silanes were hydrolyzed and the solution was diluted, with rapid stirring, with 1,361.4 g of a 2/1 mixture of isopropyl alcohol and water. The SILWET® L-720 (18 drops) wetting agent was then added and the coating bath was then aged at 20° C. with slow stirring for 48 hours. After the 48 hours it was ready for use.

A part of the PARC solution was further processed after the 48 hours of aging by deionizing it using IONAC® NM-60 mixed bed cationic(H+)/anionic-(OH−) ion exchange resin. This was done to remove cations, especially sodium, and any anions present. This deionization lowered the pH of the PARC solution from 6.2 to 3.36. This deionized solution was next catalyzed with enough tetramethylammonium acetate (TMAA) to give 400 ppm in the solution. The TMAA was added as a 5.0% solution in a 2/1 mixture of isopropyl alcohol and water. This deionized/catalyzed (D/C) solution was coated onto several different polyethylene terephthalate (PET) films. The PARC solution that was not deionized as described above was also coated onto the same type films and these films served as a control.

PET film was first flame treated at a fuel/oxygen ratio of 1.2 with the fuel being propane. Both sides were treated under the same conditions. The film was then primed with an acrylic hydrosol bath comprised of MMA/EA/MAA/2-HEA (methylmethacrylate/ethylacrylate/methacrylic acid/2-hydroxyethylacrylate) (63/32/3/2). A melamine formaldehyde cross-linking agent, CYMEL® 301 was incorporated at 7.5% based on acrylic solids. This primer was coated on a TallBoy coater to give a primer coating thickness of about 0.1 micron thick. The coating was dried at 150°–160° C. in an air oven.

These films were coated with PARC using a #12 Meyer rod. This method gave PARC coating thickness of about 2–3 microns thick. The coated films were allowed to dry at room temperature. After drying, the films were laminated to glass using the method and construction described in Example 7. The autoclave was operated at a maximum temperature of 135° C. for 30 minutes. The finished glass/PVB/PET laminates were clear and well bonded. Several other laminates were also produced to serve as controls. These were flame treated PET films. one was coated with the control PARC and the other with the D/C PARC. One flame treated control and two primed films coated with control PARC and the same coated with D/C PARC were provided.

These laminates were weathered outdoors in Arizona by DSET Laboratories, Inc., using the EMMA® (ASTM G90-85) accelerated sunshine exposure test. They were exposed with the glass surface to the sunshine (PET side away from the sun) for 11 months. Total radiation exposure was 50,208 MJ/m$^2$. The UV radiation (300–385 nm) amounted to 1,403 MJ/m$^2$.

These samples were measured for adhesion of the PARC to the PET film and degree of blistering. PARC adhesion was measured using the tape peel test (ASTM 3359-83) using SCOTCH® 670 tape. Blisters were counted using a Nikon differential interference contrast microscope. The results are presented in Table 1.

TABLE 1

| Sample No. | PARC Type | PET Film Type | PARC Adhesion % Retained | Blistering N/cm$^2$ |
|---|---|---|---|---|
| 1 | Control | Flamed | 0 | 7,380 |
| 2 | D/C | Flamed | 40 | 0 |
| 3 | Control | Primed | 70 | 91* |
| 4 | D/C | Primed | 100 | 0 |
| 5 | Control | Primed (double) | 70 | 748* |
| 6 | D/C | Primed (double) | 100 | 0 |

*Samples also highly crazed, i.e. PARC cracked.

The D/C PARC performance is superior to the control PARC on both flame treated and primed PET films. The D/C PARC gives even better performance on the primed films and outperforms the control PARC in every case. The primed films outperform the flame treated films for both the control and D/C PARC'S. The primed PET films work exceptionally well with the improved D/C PARC type as they also do with the control PARC type, but the former combination gives a very superior product.

EXAMPLE 2

In this example, PET films are primed in-line with different primer compositions and then coated on the primed side with PARC of two types, undeionized/catalyzed and deionized/catalyzed. The primed and coated films were then laminated to glass with BUTACITE® PVB resin sheeting followed by testing by immersion in boiling water and exposure in the EMMA® accelerated sunshine exposure test.

A PET extrusion-fed production line consisting of an extrusion die, quench drum, machine direction (MD) stretcher, tranverse direction (TD) tenter stretcher, heat-set oven through which the film is run under restraint in the tenter, and wind-up station was used to make a one side primed PET film. The film was coated on one side with the primer bath just after the machine direction stretching using a reverse roll coater. The coated, MD stretched film was then run through a hot air drier to dry the coating and then it entered the tenter where it was stretched in the transverse direction followed by passage (still held in the tenter under restraint) through the heat set oven where it was heated to above 200° C. The film was then cooled, separated from the tenter, and then wound into rolls.

The PET film was stretched 3.36× in the MD and 3.70 in the TD followed by heat setting at 212° C. maximum in the tenter heat set oven. The finished film thickness was 101.6 microns.

Two coating baths were used in this test, and these are described below. The primer coatings were applied at a rate giving approximately 400 Angstroms, (0.04 microns) thickness on the finished PET films.

The PET was prepared on a manufacturing line described as follows. The line conditions used were Machine Direction Stretching (MDX) of 3.4, Transverse Direction Stretching (TDX) of 4.0, heat set temperature of 200°-218° C. This line was equipped to coat primer on both the cast (unstretched) PET film web and the MD stretched film between the MD stretcher and the TD tenter stretcher. Some of the films were coated on the same side (double primer) with both a cast film coater and a post-MD coater in order to provide a thicker primer coating. Others were primer coated with the cast film coater or the post-MD stretcher coater alone to provide thinner coatings.

The primer coating compositions used are acrylic hydrosols containing varying amounts of methacrylic acid (MAA) and 2-hydroxyethylacrylate (2- HEA). CYMEL ® 301, a melamine formaldehyde cross-linking agent, was used at 7.5% based on the weight of acrylic solids.

The polysiloxane hardcoat (PARC) solutions used to coat the primed PET films were prepared as described below.

330.6 g of LUDOX ® LS colloidal silica
  242.4 g of Methyltrimethoxysilane
  25.2 g of 3-glycidoxypropyltrimethoxysilane
  570.0 g of a 2/1 solution of isopropyl alcohol and water
  9 drops of Union Carbide SILWET ® L-720 wetting agent
  The LUDOX ® was acidified to a pH of 4.90 with glacial acetic acid and was then mixed with the two silanes and stirred for several hours at 20° C. until the silanes were nearly completely hydrolyzed. When all but 5.3% of the silanes were hydrolyzed, the solution was diluted with the isoproply alcohol/water solution followed by addition of the L-720 wetting agent. This diluted solution was then aged at 20° C. for 96 hours.

Two solutions were used to coat the samples: (1) a control solution, and (2) a deionized/catalyzed solution. The control solution had a pH of 6.45, and when part of it was deionized, the pH dropped to 3.22. Addition of a 5% solution of tetramethylammonium acetate to the deionized PARC solution raised the pH to 6.09.

The films were coated with the two PARC's using a #12 Meyer wire-wound stainless steel coating rod. The coated films were allowed to dry at room temperature. They were then laminated to glass using BUTACITE ® BE-1030 PVB resin sheeting 381 microns in thickness. The primed and PARC coated films were laminated to glass using BUTACITE ® polyvinylbutyral resin sheeting followed by peel testing to determine adhesion strength between the PET film and the BUTACITE ®. The laminated samples were prepared by, (1) placing the 381 micron thick BUTACITE ®BE-1030 sheeting on top of a 30.48 cm square of float glass, (2) placing a 30.48 cm square of the PARC coated PET film with the flame treated side facing the BUTACITE ® sheeting, (3) covering the glass-/BUTACITE ®/PET combination with a 30.48 cm square of float glass resting on top of the PET surface coated with PARC, (4) placing this assembly into a vacuum bag made of polyester, (5) evacuating and vacuum sealing the bagged assembly, (6) autoclaving the vacuum bagged assembly at 135° C. at 15,513 Pa for 30 minutes. After autoclaving, the bagged laminate was removed from the autoclave, cooled, and then removed from the bag. The glass cover plate was then removed leaving a clear glass/PVB/PET laminate.

Peel strengths were determined using 0.0254 m wide lengths of the laminates. The PET was peeled from the laminate at a 180° angle using an Instron device. Peel strengths are measured in newton/meters.

The laminated samples were tested in three conditions: (1) as-laminated without any exposures, (2) after immersion in boiling water for 6 hours, and (3) after 7 months exposure in the DSET Laboratories, Inc., EMMA ® accelerated sunshine exposure test (See Example 1). Total radiation experienced was 33,472 $MJ/m^2$ and the UV radiation (300-385 nm) amounted to 852 $MJ/m^2$.

The samples were tested for abrasion resistance using the Taber Test (ANSI Z26.1-1983, Test 34), adhesion of the PARC to the PET substrate using the tape peel test (ASTM D-3359-83) with SCOTCH ® 670 tape, and population density of blisters.

The films used in the testing are tabulated below in Table 2-1.

TABLE 2-1

| Sample No. | PET Film Treatment | Primer composition MMA/EA/MAA/2-HEA | PARC Type |
|---|---|---|---|
| 2-1 | None | None | Control |
| 2-2 | Flame Treated | None | Control |
| 2-3 | Flame Treated | None | D/C |
| 2-4 | Primed | 65/33/2/0 | Control |
| 2-5 | Primed | 65/33/2/0 | D/C |
| 2-6 | Primed | 63/32/3/2 | D/C |
| 2-7 | Primed-Double | 63/32/3/2 | Control |
| 2-8 | Primed-Double | 63/32/3/2 | D/C |
| 2-9 | Primed | 63/32/1/4 | D/C |
| 2-10 | Primed | 62/31/3/4 | D/C |
| 2-11 | Primed | 59/30/3/8 | D/C |

The test results are shown in Table 2-2.

TABLE 2-2

| Sample No. | Taber Haze (%) Control | Taber Haze (%) EMMA | PARC/PET Adhesion (% Coating Retained) Control | PARC/PET Adhesion (% Coating Retained) Boil | PARC/PET Adhesion (% Coating Retained) EMMA | Blisters (Number/$cm^2$) Boil | Blisters (Number/$cm^2$) EMMA |
|---|---|---|---|---|---|---|---|
| 2-1 | 29.1 | 21.0 | 72 | 0 | 0 | 1,000+ | 1,000+ |
| 2-2 | 1.4 | 1.8 | 100 | 8 | 0 | 4,200 | 86 |
| 2-3 | 1.7 | 1.0 | 100 | 88 | 40 | 91 | 0 |

TABLE 2-2-continued

| Sample No. | Taber Haze (%) | | PARC/PET Adhesion (% Coating Retained) | | | Blisters (Number/cm²) | |
|---|---|---|---|---|---|---|---|
| | Control | EMMA | Control | Boil | EMMA | Boil | EMMA |
| 2-4 | 1.0 | 1.3 | 100 | 100 | 0 | 31 | 1,176 |
| 2-5 | 1.2 | 1.4 | 100 | 76 | 100 | 0 | 0 |
| 2-6 | 0.9 | 1.1 | 100 | 100 | 100 | 0 | 0 |
| 2-7 | 1.3 | 1.3 | 100 | 100 | 100 | 127 | 0 |
| 2-8 | 1.2 | 0.8 | 100 | 100 | 100 | 0 | 0 |
| 2-9 | 1.1 | 0.8 | 100 | 100 | 100 | 0 | 0 |
| 2-10 | 1.7 | 0.7 | 100 | 100 | 100 | 0 | 0 |
| 2-11 | 1.2 | 0.9 | 100 | 96 | 100 | 0 | 0 |

Sample 2-1 is untreated, unprimed, PET film. Adhesion to the PARC is poor, abrasion resistance is extremely poor since the coating adhesion is low, and blistering with exposure to boiling water and the sun is extensive.

The flame treated PET films, samples 2-2 and 2-3, give better properties and particularly with the de-ionized/catalyzed PARC where adhesion and blistering performances were much superior to those for samples 2-1 and 2-2.

Even better performances, for both control and D/C PARC'S, are seen using most of the primed PET films. Best performances are seen with the primers containing hydroxyl functionality in the form of 2-HEA (2-hydroxyethylacrylate), particularly with the D/C PARC. Of the 2-HEA modified primers, only the one containing 8% shows some sign of weakness with the slight loss of adhesion after 6 hours in boiling water. None of the primed PET films when coated with D/C PARC developed any blisters in either the boil or EMMA exposures.

I claim:

1. A biaxially oriented polyethylene terephthalate film having a continuous primer coating composition on one side thereof and an overlying polysiloxane coating composition thereon, said primer coating composition comprising from 40 to 80% by weight of methyl methacrylate, 18 to 60% by weight of ethylacrylate, 1 to 15% by weight methacrylic acid and 0.01 to 25% by weight hydroxyethylacrylate, further containing crosslinkable functional groups, said functional groups selected from the group consisting of hydroxy and, carboxyl groups, wherein the functional groups are crosslinked with an amine formaldehyde condensation product, and said overlying coating comprising an abrasion resistant polysiloxane containing less than $23 \times 10^{-6}$ mole per gram of alkali metal cations.

2. The film of claim 1 wherein said amine is selected from the group consisting of melamine, urea, diazine and derivatives thereof.

3. The film of claim 1 wherein the uncoated side of said film is flame treated.

4. An abrasion resistant glass/plastic glazing structure comprised of a multilayered composite, said composite comprising a sheet of glass and said film of claim 1 adhered on its uncoated side to said sheet of glass by a plasticized polyvinylbutyral film.

* * * * *